United States Patent
Hu et al.

(10) Patent No.: US 8,408,918 B2
(45) Date of Patent: Apr. 2, 2013

(54) METHOD AND APPARATUS FOR HAPTIC SIMULATION

(75) Inventors: Jianjuen Hu, Boxborough, MA (US);
Gill Pratt, Lexington, MA (US); Jeff Weber, San Francisco, CA (US)

(73) Assignee: Energid Technologies Corporation, Cambridge, MA (US)

( * ) Notice: Subject to any disclaimer, the term of this patent is extended or adjusted under 35 U.S.C. 154(b) by 1314 days.

(21) Appl. No.: 12/147,863

(22) Filed: Jun. 27, 2008

(65) Prior Publication Data

US 2009/0123896 A1    May 14, 2009

Related U.S. Application Data

(60) Provisional application No. 60/937,344, filed on Jun. 27, 2007.

(51) Int. Cl.
*G09B 23/32* (2006.01)
(52) U.S. Cl. ......... 434/262; 434/219; 434/267; 345/156
(58) Field of Classification Search .................. 434/219, 434/262, 267; 604/131; 600/29; 345/156
See application file for complete search history.

(56) References Cited

U.S. PATENT DOCUMENTS

| | | | |
|---|---|---|---|
| 6,300,936 B1* | 10/2001 | Braun et al. | 345/156 |
| 6,910,699 B2* | 6/2005 | Cherney | 280/89.13 |
| 7,326,172 B2* | 2/2008 | Miller | 600/29 |
| 2006/0097232 A1* | 5/2006 | Hakata et al. | 252/570 |
| 2009/0216191 A1* | 8/2009 | Loeffel et al. | 604/131 |

OTHER PUBLICATIONS

Biggs, J. and M.A. Srinivasan (2002). Haptic Interfaces. Handbook of Virtual Environments. K. Stanney. London, Lawrence Earlbaum, Inc.: Chapter 5, pp. 93-116.
Basdogan, C. and M.A. Srinivasan (2002). Haptic Rendering in Virtual Environments. Handbook of Virtual Environments. K. Stanney. London, Lawrence Earlbaum, Inc.: Chapter 6, pp. 117-134.
Kim, H., D.W. Rattner and M.A. Srinivasan (2003). The Role of Simulation Fidelity in Laparoscopic Surgical Training. 6th International Medical Image Computing & Computer Assisted Intervention (MICCAI) Conference, Montreal, Canada, pp. 1-8, Springer-Verlag.
A. Liu, F. Tendick, K. Cleary, and C. Kaufmann, A Survey of Surgical Simulation: Applications, Technology, and Education, Presence: Teleoperators and Virtual Environments, vol. 12, issue 6, Dec. 2003.

(Continued)

*Primary Examiner* — Kang Hu
(74) *Attorney, Agent, or Firm* — Holland & Knight LLP; Brian J. Colandreo; Michael T. Abramson

(57) ABSTRACT

A haptic simulation method determines a location of a needle assembly within a magneto-rheological fluid. The needle assembly within the magneto-rheological fluid is associated with a desired resistance value. A viscosity control signal representative of the desired resistance value is generated. The viscosity control signal is applied to a viscosity control device to vary a viscosity of the magneto-rheological fluid to achieve the desired resistance value.

15 Claims, 4 Drawing Sheets

OTHER PUBLICATIONS

Gerovich, O., Marayong, P., and Pkamura, A.M., The effect of visual and haptic feedback on computer-assisted needle insertion, Computer Aided Surgery, 2004; 9(6):243-249.

Hu, J. SBIR Phase I Final Report of Regional Anesthesia Simulation for Training of Resident and Staff Pain Management Specialists, Contract W81XWH-06-C-0052, Aug. 16, 2006.

S. De, Y.J. Lim, and M.A. Srinivasan, Point-Associated Finite Field (PAFF) Approach for Physically-based Digital Surgery, Presence: Teleoperators and Virtual Environments, 15 (3), pp. 294-308, 2006.

Digital Virtual Human Model of Touch of Life Technologies, http://www.toltech.net/products/index.htm, 2007, pp. 1-2.

Magneto-Rheological (MR) Technology, http://www.llord.com/Default.aspx?alias=www.lord.com/mr, 1998-2008, pp. 1.

New York School of Regional Anesthesia: www.nysora.com, 1996-2009, pp. 1-7.

Science at NASA, "Amazing Magnetic Fluids", http://science.nasa.gov/headlines/y2002/23aug_MRfluids.htm, Aug. 23, 2002, pp. 1-5.

\* cited by examiner

METHOD AND APPARATUS FOR HAPTIC SIMULATION

RELATED APPLICATION

This application claims priority of U.S. provisional application 60/937,344, filed on 27 Jun. 2007, the entire contents of which are incorporated herein by reference in its entirety.

GOVERNMENT LICENSE RIGHTS TO CONTRACTOR-OWNED INVENTIONS MADE UNDER FEDERALLY SPONSORED RESEARCH AND DEVELOPMENT

The U.S. Government has a paid-up license in this invention and the right in limited circumstances to require the patent owner to license others on reasonable terms as provided for by the terms of contract No. W81XWH-06-C-0052 awarded by the Office of the Secretary of Defense.

TECHNICAL FIELD

This disclosure relates to haptic simulation and, more particularly, to simulated needle insertion and simulated fluid injection.

BACKGROUND

Over the past decade, the use of peripheral nerve blocks for intraoperative and postoperative analgesia, or pain control, has become increasingly popular. Though nerve block procedures may present fairly low risk in a hospital setting, the same is not always true on the battlefield, where severe trauma cases may be prevalent and properly trained pain management specialists may be in high demand. There may be a need for all military anesthesiologists to undergo training for the administration of peripheral nerve blocks, yet currently no suitable curriculum or training system exists for hospitals and medical schools. Industries and institutions have been involved in developing a natural, immersive virtual environment, incorporating haptic, visual, and auditory feedback. Anesthesiologists may use realistic interface platforms of needle and syringe in simulated procedures. This may be achieved through a needle tracking system and innovative devices for generating haptic feedback during needle insertion, needle injection, and palpation, for example.

SUMMARY OF DISCLOSURE

According to a first aspect of this disclosure, a method includes determining a location of a needle assembly within a magneto-rheological fluid. The location of the needle assembly within the magneto-rheological fluid is associated with a desired resistance value. A viscosity control signal representative of the desired resistance value is generated. The viscosity control signal is applied to a viscosity control device to vary a viscosity of the magneto-rheological fluid to achieve the desired resistance value.

One or more of the following features may be included. The desired resistance value may emulate a resistance required to displace the needle assembly through one or more layers of tissue (e.g., skin; fat; nerves; cartilage; muscle; and bone). Varying the viscosity of the magneto-rheological fluid may include applying a magnetic field to the magneto-rheological fluid.

According to another aspect of this disclosure, a simulation apparatus includes a container assembly. A magneto-rheological fluid is positioned within the container assembly. A needle assembly is configured to be displaceable through the magneto-rheological fluid. A displacement sensor is configured to determine a location of the needle assembly within the magneto-rheological fluid and generate a location signal indicative of the location. A resistance control device, responsive to the location signal, is configured to: associate the location of the needle assembly within the magneto-rheological fluid with a desired resistance value, and generate a viscosity control signal representative of the desired resistance value. A viscosity control device, responsive to the viscosity control signal, is configured to vary the viscosity of the magneto-rheological fluid to achieve the desired resistance value.

One or more of the following features may be included. The viscosity control device may include an electromagnetic field winding and a magnetic flux guide. The magnetic flux guide may be configured to provide a magnetic field within the container assembly. The magnetic field may vary the viscosity of the magneto-rheological fluid to achieve the desired resistance value. A pitch-roll actuator may be configured to allow the simulation apparatus to be displaced within a plurality of axes.

According to another aspect of this disclosure, a simulation apparatus includes a syringe assembly. A magneto-rheological fluid is positioned within the syringe assembly, the syringe assembly including a plunger assembly for displacing at least a portion of the magneto-rheological fluid from an orifice of the syringe assembly. A viscosity control device, responsive to a viscosity control signal, is configured to vary a viscosity of the magneto-rheological fluid displaced from the orifice of the syringe assembly to achieve a desired plunger resistance value. One or more of the following features may be included. The viscosity control device may include an electromagnetic field winding and a magnetic flux guide. The magnetic flux guide may be configured to provide a magnetic field within a tube assembly coupled to the orifice of the syringe assembly. The magnetic field may vary the viscosity of the magneto-rheological fluid to achieve the desired plunger resistance value. The simulation apparatus may also include a magneto-rheological fluid tank, wherein the magneto-rheological fluid tank may be configured to receive the magneto-rheological fluid from the tube assembly. The simulation apparatus may also include a resistance control device for generating the viscosity control signal.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
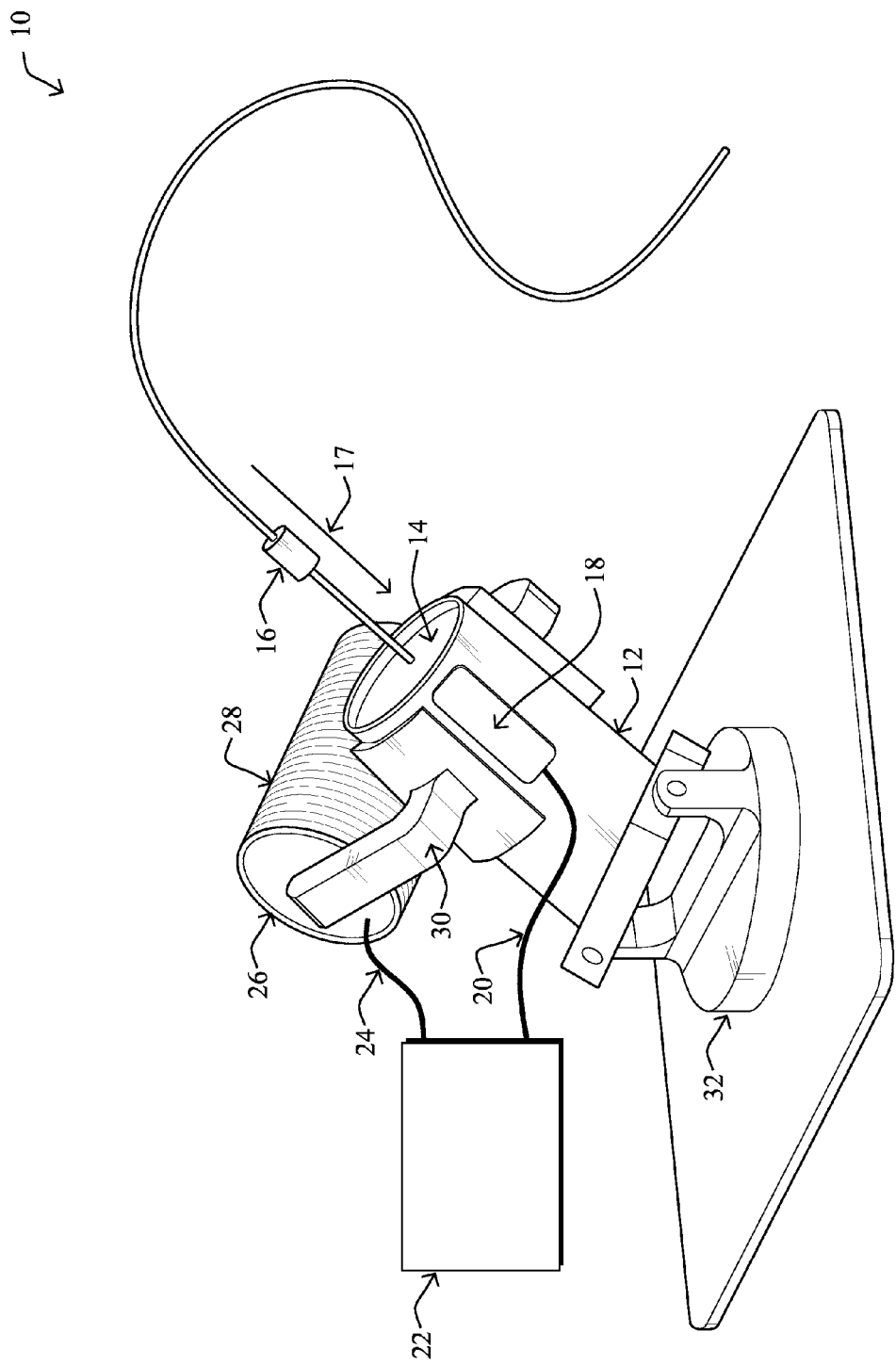
FIG. 1 is a diagrammatic view of a simulation apparatus.

Referring to FIG. 1, there is shown simulation apparatus 10 for simulating, at least in part, haptic feedback produced by insertion of a needle into tissue. Simulation apparatus 10 may include container assembly 12. As is known to one of skill in the art, container assembly 12 may include any container suitable for containing magneto-rheological fluid 14 (e.g., a plastic container or a metallic container). Further, and as will be discussed in greater detail below, magneto-rheological fluid 14 may include micrometer-sized magnetic particles suspended in a carrier fluid, e.g., oil. Moreover, when subjected to a magnetic field, magneto-rheological fluid 14 may experience significantly increased viscosity, even to the point of becoming a viscoelastic solid.

Magneto-rheological fluid 14 may be positioned within container assembly 12. For example, container assembly 12 may contain at least a portion of magneto-rheological fluid 14. Additionally, needle assembly 16 may be configured to be displaceable through magneto-rheological fluid 14 (e.g., in the direction of arrow 17). Specifically, at least a portion of needle assembly 16 may be inserted into magneto-rheological fluid 14, which may be contained within container assembly 12.

Figure 2:
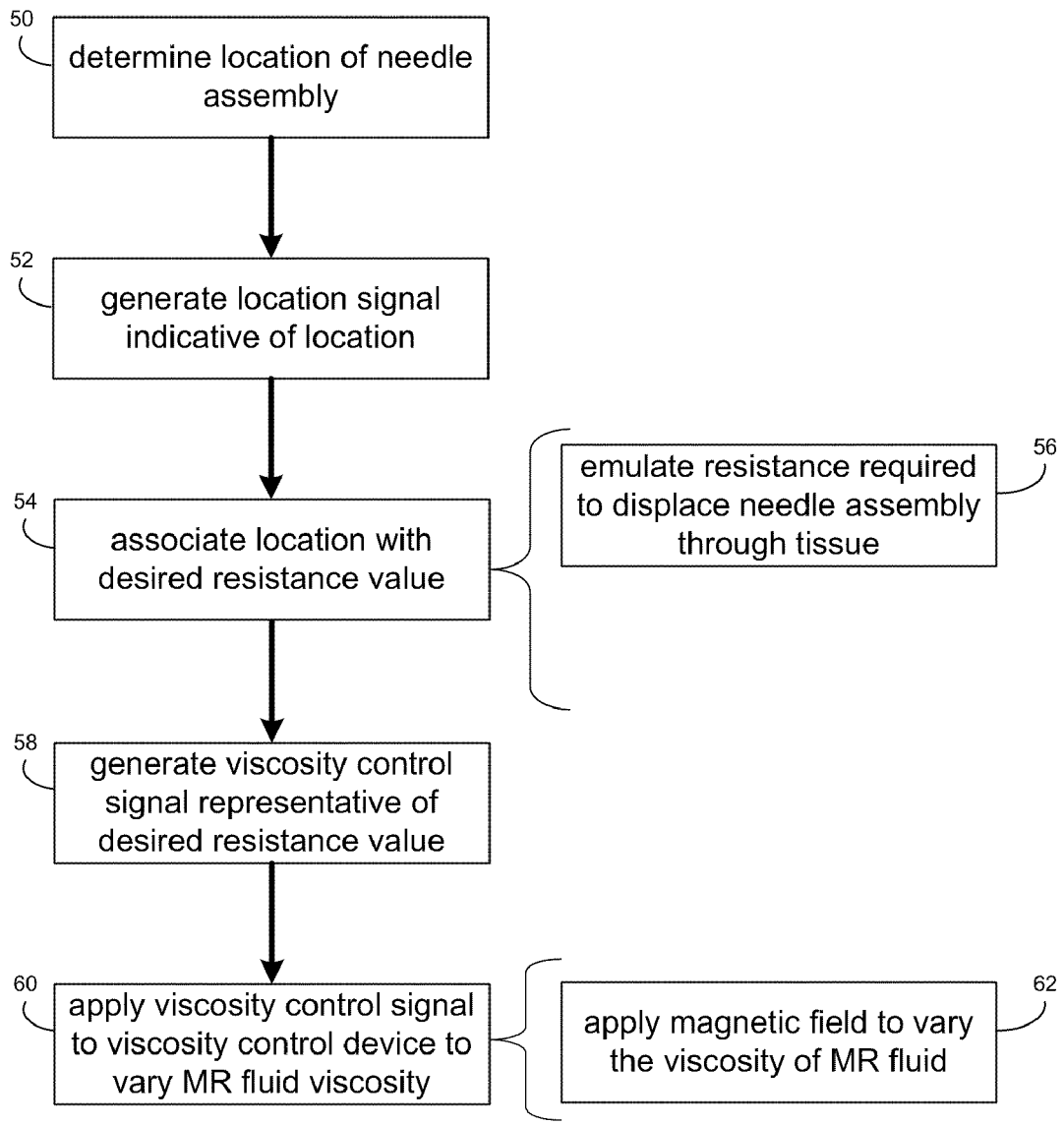
FIG. 2 is a flowchart of the process employed by the simulation apparatuses of FIG. 1 and FIG. 4.

Referring also to FIG. 2, simulation apparatus 10 may also determine 50 a location of needle assembly 16 within magneto-rheological fluid 14. For example, simulation apparatus 10 may include displacement sensor 18, which may be configured to determine 50 a location (not shown) of needle assembly 16 and generate 52 a location signal (not shown) that may be indicative of the location. Examples of displacement sensor 18 may include, but are not limited to: camera-based tracking systems and radio-frequency ("RF") tracking systems.

Continuing with the above-stated example of a camera-based tracking system, displacement sensor 18 may include an optical camera (not shown) positioned to receive visually-perceptible information regarding the essentially linear location of needle assembly 16 within container assembly 12. Displacement sensor 18 may then generate 52 a location signal that may represent the location of needle assembly 16 within container assembly 12 (e.g., needle assembly 16 may be essentially linearly displaced 4 millimeters with respect to container assembly 12).

The location signal generated 52 may be transmitted along location signal line 20 to resistance control device 22. Resistance control device 22 may be responsive to the location signal received on location signal line 20, and may be configured to associate 54 the location of needle assembly 16 within magneto-rheological fluid 14 with a desired resistance value. As will be discussed in greater detail below, a desired resistance value may represent the resistance that would be felt on needle assembly 16 if needle assembly 16 was actually being inserted through one or more layers of tissue (as opposed to magneto-rheological fluid 14).

Figure 3:
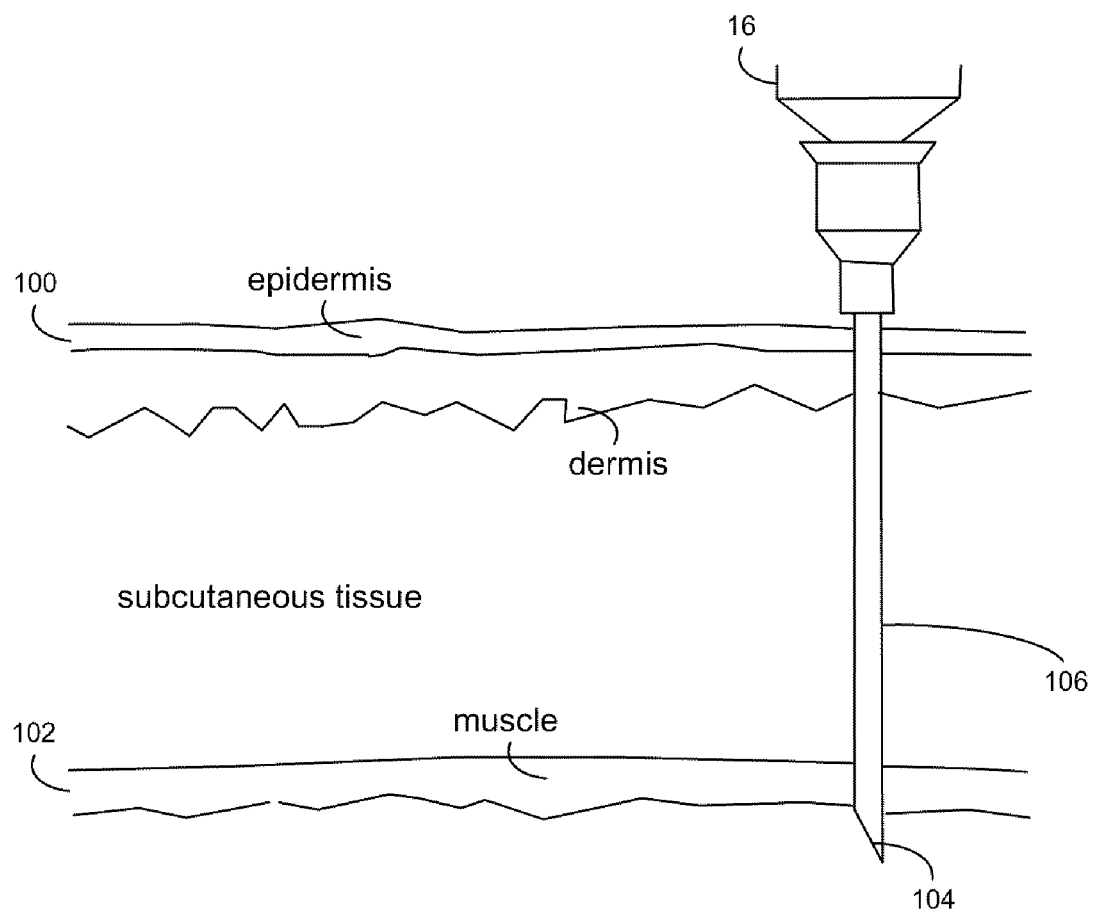
FIG. 3 is a diagrammatic view of a needle insertion.

Associating 54 the location of needle assembly 16 with a desired resistance value may include emulating 56 a resistance required to displace needle assembly 16 through one or more layers of tissue. For example, and referring also to FIG. 3, the one or more layers of tissue may include one or more of: skin 100; fat (not shown); nerves (not shown); cartilage (not shown); muscle 102; and bone (not shown). As is known in the art, different layers of tissue may have different densities. Accordingly, the resistance required (i.e., the desired resistance value) for emulating 56 the passage of needle assembly 16 through skin 100 is typically less than the resistance required for emulating 56 the passage of needle assembly 16 through bone.

As needle assembly 16 is displaced through the one or more layers of tissue, the resistance imparted upon it may vary depending on the stage of insertion and the forces acting on needle assembly 16. Generally, the insertion process may include four events: tissue deformation, puncture, insertion and tissue relaxation, and withdrawal. During the insertion process, the forces acting on needle assembly 16 may include, but are not limited to: the force at tip 104 of needle assembly 16 required for penetrating the one or more layers of tissue; the friction force of the one or more layers of tissue sliding along shaft 106 of needle assembly 16; and the clamping force of the one or more layers of tissue on needle assembly 16. To accurately simulate the insertion of needle assembly 16 into the one or more layers of tissue, the resistance created by each of these events and forces may be emulated 56 by resistance control device 22.

As is known in the art, as needle assembly 16 is inserted further into the one or more layers of tissue, it may undergo a series of micro-punctures where the resistance may increase at the threshold of each micro-puncture, and may then decrease after such micro-puncture. Further, after the initial puncture and insertion of needle assembly 16 into skin 100, the resistance may increase relatively linearly along the insertion path as the surface area of needle assembly 16 in contact with the layers of tissue increases. This may result in greater friction and greater clamping force of the one or more layers of tissue along shaft 106 of needle assembly 16.

An exception to the relatively linear increase in resistance may exist with regard to puncture events along the insertion path, as puncture events may result from a change in the stiffness of the one or more layers of tissue due to their non-homogeneity. A puncture event may include, but is not limited to, deformation of the one or more layers of tissue, yielding increased resistance, followed by puncture, yielding a sudden decrease in resistance.

Utilizing the location signal provided by displacement sensor 18 via location signal line 20, resistance control device 22 may associate 54 the location of needle assembly 16 within magneto-rheological fluid 14 with a desired resistance value, wherein the desired resistance value may emulate the resistance indicated by, e.g., exemplary insertion resistance profile 108.

After associating 54 the location of needle assembly 16 with a desired resistance value, resistance control device 22 may generate 58 a viscosity control signal that may be representative of the desired resistance value. The viscosity control signal may be transmitted along viscosity control signal line 24 to viscosity control device 26. The viscosity control signal may then be applied 60 to viscosity control device 26 to vary a viscosity of magneto-rheological fluid 14 to achieve the desired resistance value.

Viscosity control device 26, responsive to the viscosity control signal provided via viscosity control signal line 24, may be configured to vary the viscosity of magneto-rheological fluid 14 to achieve the desired resistance value. As discussed above, and as is known in the art, magneto-rheological fluid 14 may include micrometer-sized magnetic particles suspended in a carrier fluid, e.g., oil. Moreover, when subjected to a magnetic field, magneto-rheological fluid 14 may experience significantly increased viscosity, even to the point of becoming a viscoelastic solid. Accordingly, the viscosity of magneto-rheological fluid 14 may be varied by applying 62 a magnetic field to magneto-rheological fluid 14.

As will be discussed in greater detail below, viscosity control device 26, which may include electromagnetic field winding 28 and magnetic flux guide 30, may vary the viscosity of magneto-rheological fluid 14 by varying the electric current it transmits to electromagnetic field winding 28. Specifically, and as is known in the art, the strength of a magnetic field may be varied by proportionally varying the amplitude of the current passing through electromagnetic field winding 28. Accordingly, in the event that a higher level of resistance is required/desired, viscosity control device 26 may increase the strength of the magnetic field experienced by magneto-rheological fluid 14 and thus increase the level of resistance (i.e., the desired resistance value) experienced by the user (not shown) of simulation apparatus 10. Conversely, in the event that a lower level of resistance is required/desired, viscosity control device 26 may decrease the strength of the magnetic field experienced by magneto-rheological fluid 14 and thus decrease the level of resistance (i.e., the desired resistance value) experienced by the user (not shown) of simulation apparatus 10.

Magnetic flux guide 30 may be configured to provide the above-described magnetic field within container assembly 12 (i.e., the container in which magneto-rheological fluid 14 is contained).

Simulation apparatus 10 may also include pitch-roll actuator 32 that may be configured to allow simulation apparatus 10 to be displaced within a plurality of axes. As the insertion of needles into tissue may be performed from a variety of different angles, pitch-roll actuator 32 may allow simulation apparatus 10 to simulate needle insertion from many of the different angles.

Figure 4:
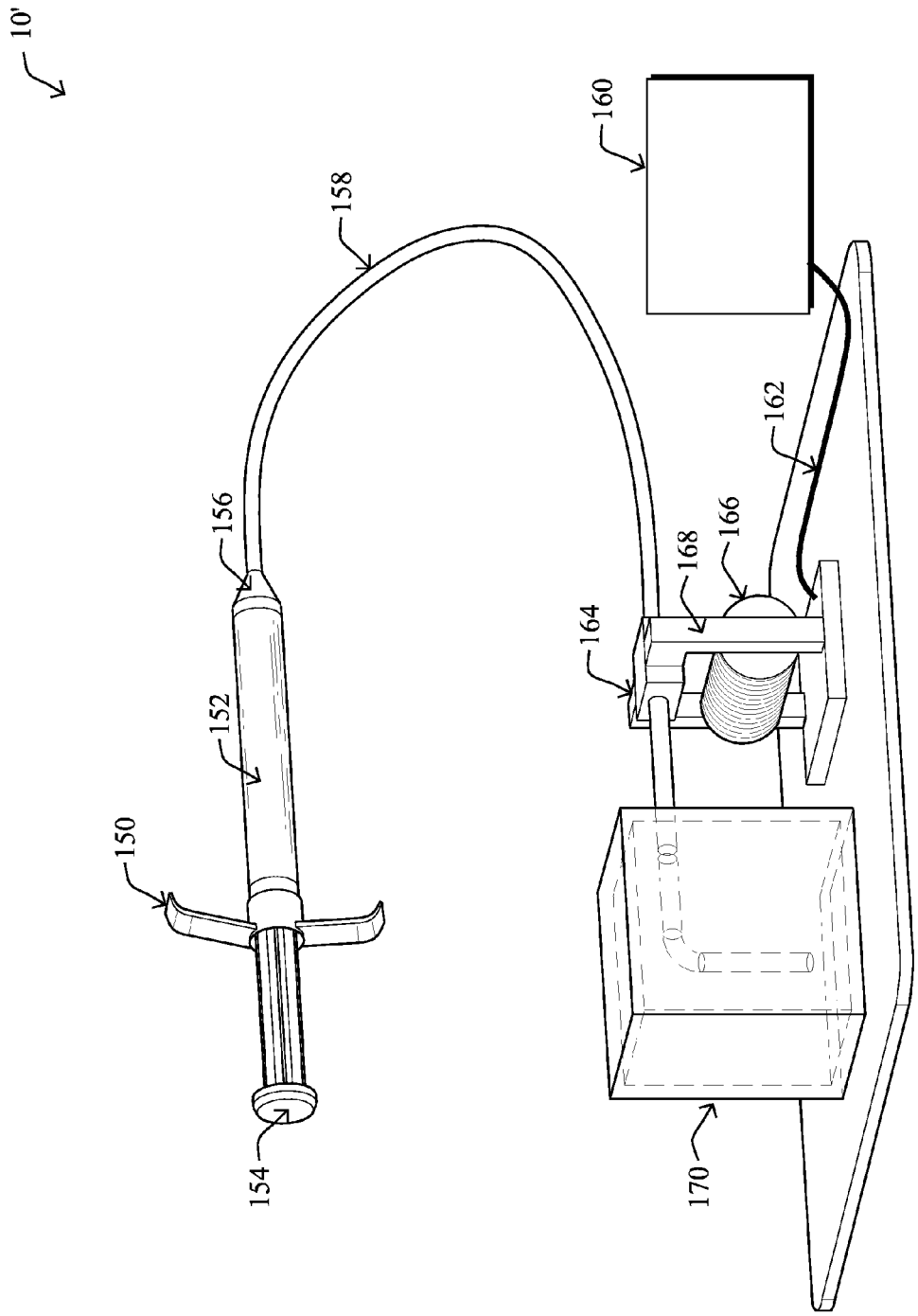
FIG. 4 is a diagrammatic view of an alternative embodiment of the simulation apparatus of FIG. 1.

Referring also to FIG. 4, there is shown an alternative embodiment simulation apparatus 10' for simulating injection of fluids into the above-described layers of tissue. Simulation apparatus 10' may include syringe assembly 150. Magneto-rheological fluid 152 may be positioned within syringe assembly 150, wherein syringe assembly 150 may include plunger assembly 154 for displacing at least a portion of magneto-rheological fluid 152 from orifice 156 of syringe assembly 150. For example, as plunger assembly 154 is depressed, magneto-rheological fluid 152 may be displaced from orifice 156 and into tube assembly 158.

To simulate the resistance imparted on plunger assembly 154 when injecting fluids into one or more layers of tissue, simulation apparatus 10' may include resistance control device 160 for generating a viscosity control signal representative of a desired plunger resistance value. Resistance control device 160 may be manually programmed by a user (not shown) to generate the desired plunger resistance value. Alternatively, resistance control device 160 may be remotely controlled by an external device (e.g., a computing device; not shown) to automatically generate the desired plunger resistance value.

The viscosity control signal may be transmitted via viscosity control signal line 162 to viscosity control device 164. For example, if simulation apparatus 10' is being used to simulate the injection of fluids into skin 100, the desired plunger resistance value may emulate the resistance imparted on plunger assembly 154 based upon the empirically-defined resistance of skin 100 to the absorption of a fluid. Specifically, resistance control device 160 may be configured to adjust the viscosity of magneto-rheological fluid 152 so that simulation apparatus 10' emulates the resistance that would be experienced by a user (not shown) when injecting e.g., saline solution into skin 100. As the resistance of skin 100 to the absorption of e.g., saline solution may be different than the resistance experienced when injecting saline solution into muscle 102 (i.e., a denser tissue), resistance control device 160 may be configured to adjust the level of resistance experienced. Accordingly and in the event that the injection of e.g., saline solution into muscle tissue is being simulated, resistance control device 160 may generate a viscosity control signal representative of a higher desired plunger resistance value (i.e., when compared to injecting saline solution into skin 100).

Viscosity control device 164, which is responsive to the above-described viscosity control signal provided via control signal line 162, may be configured to vary the viscosity of magneto-rheological fluid 152 to achieve a desired plunger resistance value. As discussed above, the desired plunger resistance value may emulate a force required to inject a fluid (e.g., saline solution) into one or more layers of tissue.

Viscosity control device 164, which may include electromagnetic field winding 166 and magnetic flux guide 168, which may vary the viscosity of magneto-rheological fluid 152 by varying the amplitude of the electric current that viscosity control device 164 provides to electromagnetic field winding 166. As discussed above, tube assembly 158 may be coupled to orifice 156 of syringe assembly 150. Moreover, magnetic flux guide 168 may be configured to provide a magnetic field within tube assembly 158 (i.e., at an area proximate magnetic flux guide 168) to vary the viscosity of magneto-rheological fluid 152 proximate magnetic flux guide 168 and achieve the desired plunger resistance value.

Simulation apparatus 10' may also include magneto-rheological fluid tank 170, wherein magneto-rheological fluid tank 170 may be configured to receive magneto-rheological fluid 152 from tube assembly 158. For example, as magneto-rheological fluid 152 is displaced from orifice 156 into tube assembly 158, a reservoir may be necessary to contain the displaced magneto-rheological fluid 152. Accordingly, magneto-rheological fluid tank 170 may function as a reservoir for containing at least a portion of the displaced magneto-rheological fluid 152.

A number of implementations have been described. Nevertheless, it will be understood that various modifications may be made. Accordingly, other implementations are within the scope of the following claims.

What is claimed is:
1. A method comprising:
   determining a location of a needle assembly within a magneto-rheological fluid;
   associating the location of the needle assembly within the magneto-rheological fluid with a desired resistance value;
   generating a viscosity control signal representative of the desired resistance value; and
   applying the viscosity control signal to a viscosity control device to vary a viscosity of the magneto-rheological fluid to achieve the desired resistance value.
2. The method of claim 1 wherein the desired resistance value emulates a resistance required to displace the needle assembly through one or more layers of tissue.
3. The method of claim 2 wherein the one or more layers of tissue include one or more of: skin; fat; nerves; cartilage; muscle; and bone.
4. The method of claim 1 wherein varying the viscosity of the magneto-rheological fluid includes applying a magnetic field to the magneto-rheological fluid.
5. A simulation apparatus comprising:
   a container assembly;
   a magneto-rheological fluid positioned within the container assembly;
   a needle assembly configured to be displaceable through the magneto-rheological fluid;
   a displacement sensor configured to determine a location of the needle assembly within the magneto-rheological fluid and generate a location signal indicative of the location;
   a resistance control device, responsive to the location signal, configured to:
      associate the location of the needle assembly within the magneto-rheological fluid with a desired resistance value, and generate a viscosity control signal representative of the desired resistance value; and a viscosity control device, responsive to the viscosity control signal, configured to vary the viscosity of the magneto-rheological fluid to achieve the desired resistance value.

6. The simulation apparatus of claim 5 wherein the viscosity control device includes: an electromagnetic field winding; and a magnetic flux guide.

7. The simulation apparatus of claim 6 wherein the magnetic flux guide is configured to provide a magnetic field within the container assembly.

8. The simulation apparatus of claim 7 wherein the magnetic field varies the viscosity of the magneto-rheological fluid to achieve the desired resistance value.

9. The simulation apparatus of claim 5 further comprising:
a pitch-roll actuator configured to allow the simulation apparatus to be displaced within a plurality of axes.

10. A simulation apparatus comprising:
a syringe assembly;
a magneto-rheological fluid positioned within the syringe assembly, the syringe assembly including a plunger assembly for displacing at least a portion of the magneto-rheological fluid from an orifice of the syringe assembly; and
a viscosity control device, responsive to a viscosity control signal, configured to vary a viscosity of the magneto-rheological fluid displaced from the orifice of the syringe assembly to achieve a desired plunger resistance value.

11. The simulation apparatus of claim 10 wherein the viscosity control device includes: an electromagnetic field winding; and a magnetic flux guide.

12. The simulation apparatus of claim 11 wherein the magnetic flux guide is configured to provide a magnetic field within a tube assembly coupled to the orifice of the syringe assembly.

13. The simulation apparatus of claim 12 wherein the magnetic field varies the viscosity of the magneto-rheological fluid to achieve the desired plunger resistance value.

14. The simulation apparatus of claim 12 further comprising:
a magneto-rheological fluid tank, wherein the magneto-rheological fluid tank is configured to receive the magneto-rheological fluid from the tube assembly.

15. The simulation apparatus of claim 10 comprising:
a resistance control device for generating the viscosity control signal.

* * * * *